Oct. 7, 1941.                J. M. GOLDBERG                 2,258,356
                               FILM SPLICER
                         Filed March 18, 1940            3 Sheets-Sheet 1

Inventor:
Jacob M. Goldberg
By
Martin E. Anderson
Attorney

Oct. 7, 1941.                J. M. GOLDBERG                2,258,356
                                FILM SPLICER
                            Filed March 18, 1940            3 Sheets-Sheet 2

Inventor:
Jacob M. Goldberg
By Martin E. Anderson
Attorney

Oct. 7, 1941.　　　J. M. GOLDBERG　　　2,258,356
FILM SPLICER
Filed March 18, 1940　　　3 Sheets-Sheet 3

Inventor:
Jacob M. Goldberg
By Martin E. Anderson
Attorney

Patented Oct. 7, 1941

2,258,356

UNITED STATES PATENT OFFICE 2,258,356

FILM SPLICER

Jacob M. Goldberg, Denver, Colo.

Application March 18, 1940, Serial No. 324,526

12 Claims. (Cl. 154—42)

The invention relates to improvements in film splicers of the type described and claimed in my Patent No. 2,231,383, February 11, 1941.

In the manufacture and exhibition of moving picture films it frequently becomes necessary to splice the same and for this purpose various film splicing devices have been manufactured and sold.

During exhibition it frequently happens that films become torn and must be repaired as quickly as possible to have them ready for the succeeding exhibition and it is therefore desirable to have an apparatus that performs this operation expeditiously and also produces a perfect splice.

In the patent above identified, a film splicing mechanism has been described and claimed which operates very satisfactorily and on which this present invention is an improvement.

It is an object of this invention to produce a simple and substantial film splicing member that can be employed by itself in any place where films are to be spliced or repaired and which can also be associated with a film rewind mechanism and so positioned with respect thereto that it can be quickly moved into and out of operative position.

In the device described and claimed in the patent above identified the film cleaner is reciprocated by power derived from a motor which also operates the cleaner. In the present mechanism the cleaner is operated by means of an electric motor, but it is reciprocated by manually operable means.

Another object of this invention is to produce a film splicing device that shall be so constructed as to entirely eliminate any danger of fire resulting from sparks produced by the opening and closing of the electric circuit connection therewith.

A still further object is to produce a splicer having a heating element associated therewith and connected with the electric current supply by means of a switch mechanism that automatically disconnects the heater when the splicer is not in use and which establishes the heater connection when the splicer is in operation.

A further object of the invention is to produce a splicer having an electric motor for operating the rotary cleaner and which motor is controlled by means of two or more mercury switches connected in series which in turn are operated by the film clamping means in such a way that the motor will not operate until the parts are brought into proper position.

A still further object is to produce a device of the kind described in which a thermostatic switch is connected in circuit with the motor and with the heater so as to open the electric circuit in case the parts become overheated.

The above and other objects that may become apparent as this description proceeds are attained by means of a construction and an arrangement of parts that will now be described in detail, and for this purpose reference will be had to the accompanying drawings in which the preferred embodiment of the invention has been illustrated, and in which.

Figure 1:
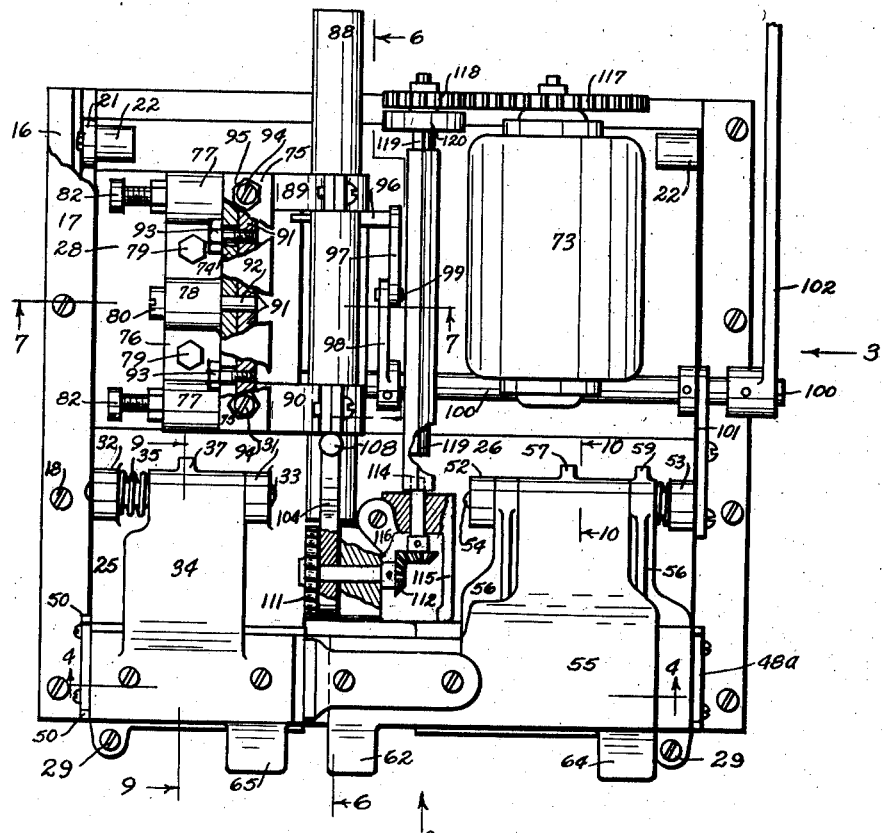
Figure 1 is a top plan view of the splicer.

In the drawings reference numeral 15 designates a support which comprises a metal plate which is preferably made of aluminum and which is provided at opposite ends with an upwardly extending flange 16 to the top of which a removable guide plate 17 is secured and held in place by screws 18. The guide plates are wider than the flanges and project inwardly as shown in Figure 7. Resting on the support is the splicer which comprises a base 19 having its front edge provided with two spaced downwardly extending flanges 20 that serve as limit stops. The base is provided along each end with two supporting rollers 21 that are mounted for rotation on pivots carried by lugs 22. In the drawings only two of these plugs have been shown in Figure 1 because the other two are so located that they cannot be seen in a plan view. The other two wheels are, however, shown in Figure 2. The wheels are of such size that the base is supported a short distance above the upper surface of support 15 so as to provide a free movement. The upper surface of the support is provided with a longitudinally extending groove 23 for the reception of a lug 24 that projects thereinto from the bottom of base 19, and which serves to limit the extent of relative movement towards the left when viewed as in Figure 6. The flanges 20 serve to limit the movement towards the right and by this means the splicer is limited to a predetermined movement with respect to the support.

Figure 9:
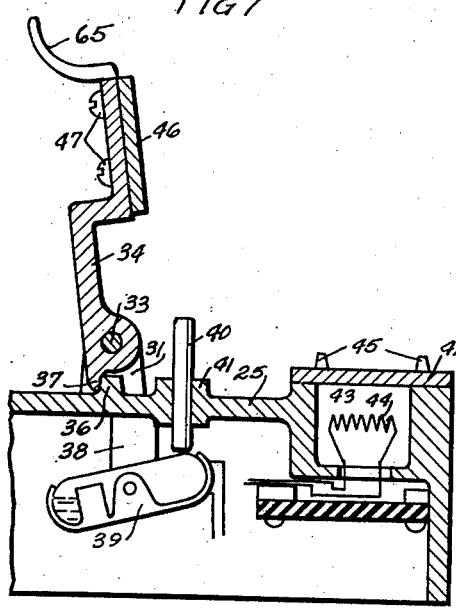
Figure 9 is a section taken on lines 9—9, Figures 1 and 2.

Supported on the base 19 is a body of cast material which comprises two spaced supporting members 25 and 26 that are connected by a part 27. The part 25 extends rearwardly and is integral with the part designated by reference numeral 28. This casting is, as above stated, hollow and is attached to the base 19 by means of a plurality of screws 29 that extend through lugs 30 provided for their reception. Positioned within the hollow casting are various electrical switches and cut-outs that have not been shown in detail, but which have been indicated in their relative positions in the wiring diagram shown in Figure 11. Extending upwardly from the top of the portion 25 are two lugs 31 and 32 which are provided with openings for the reception of a pivot pin 33 to which is attached a clamping jaw member 34. A helical compression spring 35 is positioned between the lug 32 and the adjacent side of jaw member 34 and exerts a pressure which forces the jaw against the surface of lug 31, thereby maintaining it in a predetermined position relative to this lug and also provides a certain amount of friction that serves to hold the jaw in an intermediate position. Extending upwardly from the top of the casing is a lug 36 that is positioned to engage a cooperating lug 37 carried by the jaw member 34. Lugs 36 and 37 limit the movement of the clamping jaw. On the under surface of member 25 two brackets 38 extend downwardly and pivotally supported by these two brackets is a mercury switch 39 that is normally maintained in open position as shown in Figure 9. A pin 40 extends through an opening in lug 41 and is of such length that its upper end will be engaged by the under surface of jaw member 34 whenever the latter is moved into film clamping position. It will therefore be apparent that switch 39 is open whenever the jaw member 34 is open and is closed whenever the jaw member is moved to operative or film clamping position. Supporting member 25 is provided with a removable steel plate 42 that is held in place thereon by a plurality of screws which have not been shown. Directly beneath plate 42 is a recess or opening 43 in which is located an electric heating element 44. Plate 42 is provided with two upwardly extending pins 45 that serve to position a film in place thereon. Jaw member 34 is provided with a removable steel plate 46 that is held in place by means of screws 47. Plate 46 has openings for the reception of positioning pins 45. At the left end of supporting member 25 is a removable plate 48 that is held in place by means of screws 49. The upper edge of this plate has a wide notch between the lugs 50 which serve to position the film 51 with respect to the upper surface of plate 42. It will be observed from Figure 4 that plate 42 projects a short distance to the right of the upwardly extending wall of supporting member 25 and that plate 46 terminates a short distance to the left. The two righthand ends of plates 42 and 46 serve as shear members for cutting the film in a manner which will presently appear.

Figure 10:
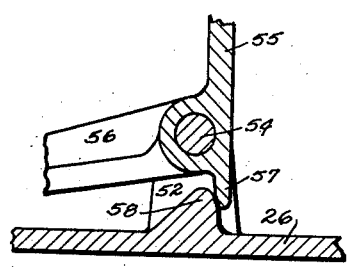
Figure 10 is a section taken on line 10—10, Figure 1.

Extending upwardly from the top of supporting projection 26 are two lugs 52 and 53. These lugs are provided with openings for the reception of the pivot 54. Mounted for rotation about pivot 54 are a pair of clamping jaws 55 and 56. Clamping jaw 56 has two rearwardly extending spaced arms through the ends of which the pivot 54 extends and clamping jaw 55 has an extending portion of the proper width to fit between the two arms of jaw 56 in a manner clearly shown in Figure 1. Clamping jaw 55 is provided with a projection 57 that engages a lug 58 that extends upwardly from the top of the support 26 in a manner shown in Figure 10. The projection 57 and the lug 58 serve to limit the upward movement of clamping jaw 55. One of the rearwardly extending arms of clamping jaw 56 is provided with a projection 59 that engages and depresses a pin 60 when this jaw moves to vertical position. Pin 60 operates the mercury switch 61 shown in Figure 11. The relationship of the projection 59 and the pin 60 has been shown in Figure 3 where a part has been broken away to disclose these elements. Clamping jaw 55 is provided at its inner or left hand end, when viewed as in Figure 3, with an upwardly extending and curved projection 62 that can be engaged by the operator's finger for separating the pair of jaws. It is also provided with a downwardly extending curved spring 63 that engages over the inner surface of clamping jaw 56 to hold the two jaws in operative position. Clamping jaw 56 is also provided with an upwardly extending projection 64 that corresponds in function to the member 62. A similar projection 65 is formed integral with jaw member 34. Clamping jaw 56 has upwardly extending pins 66 that project into corresponding openings in the under surface of clamping jaw 55 when the two jaws are in operative position as shown in Figure 4. A plate 67 is attached to the under surface of clamping jaw 56 and held in place by means of screws 68. Plate 67 is adjusted so that its end is in alignment with the opposing end of plate 42 and so adjusted relative thereto that when it is moved downwardly from the position shown in Figure 4 it will shear the film 51. A spring plate 69 is attached to the upper surface of clamping jaw 55 by screw 70 and the left hand end of this spring plate is curved as indicated at 71 and projects downwardly and thence towards the left where it terminates in a short flat strip 72 that cooperates with the adjacent end of plate 46 for the purpose of shearing the film. The flat strip 72 also serves to hold the two ends of the film in position while the cement is drying, in the manner shown in Figure 5. Clamping jaws 55 and 56 can be turned about the pivot 54 independently of each other or as a unit.

Attention is called to the fact that mercury switch 61 is normally open and closes only when clamping jaw 56 is in horizontal position. Since the motor 73 is connected in series with both switches 39 and 61, it is obvious that it will not operate unless both of said switches are in closed position, the object of this will appear as the description proceeds. Attached to the right-hand end of clamping jaw 55 is a removable plate 48a that corresponds to plate 48 that has already been described.

From the above description it will be apparent that if two pieces of film are to be spliced, the end of one piece can be positioned on top of plate 42 and held against movement by means of jaw 34 to which the plate 46 is attached. Pins 45 that project through sprocket openings in the film, position it in such a way with respect to shearing and of plate 42 that when the other film is brought into engagement therewith in the manner shown in Figure 5, the frames will be properly spaced. The end of the other film is positioned between jaw members 55 and 56 in the manner shown in Figure 4, and when the pair of jaw members is moved downwardly into contact with the supporting surface of part 26, the two ends of the films will be sheared and superposed one on the other. Before the films can be attached the emulsion must be cleaned from the upper surface of the lowermost film and cement applied to the clean surface and the means for cleaning the film will now be described.

Attached to the upper surface of the portion designated by reference numeral 28 is a metal bracket 74 that is provided at its top with a flange 75 that extends towards the right, when viewed as in Figure 7, and with a base 76 whose under surface rests on the top of part 28. The base 76 has three enlargements, two of which have been designated by reference numeral 77 and one of which has been designated by reference numeral 78. Cap screws 79 extend through the base 76 and have threaded engagement with the top of portion 28 and serve to hold member 74 firmly in position. A screw 80 extends through an opening in the enlarged part 78 and has its inner end in threaded engagement with a guide member 81. A reference to Figure 7 will show that the opening in part 78 is somewhat larger than the diameter of the screw and the latter therefore can move relative to the wall of this opening.

Figure 6:
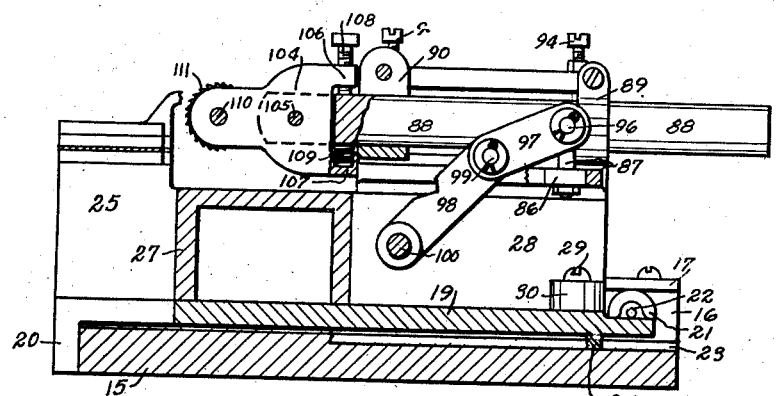
Figure 6 is a section taken on line 6—6, Figure 1.
Figure 7:
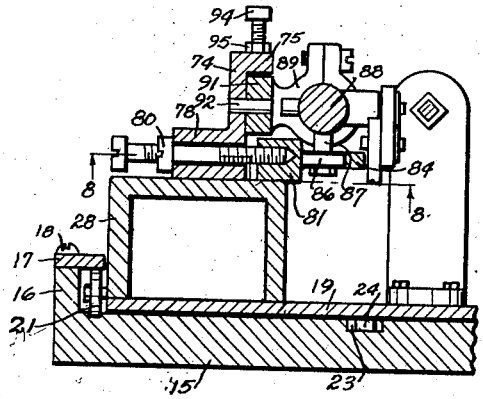
Figure 7 is a section taken on line 7—7, Figure 1.
Figure 8:
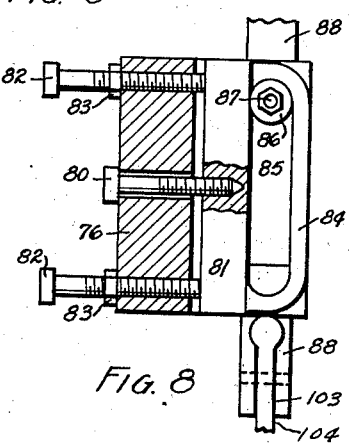
Figure 8 is a section taken on line 8—8, Figure 7.

Referring now to Figure 8, which is a section taken on line 8—8, Figure 7, it will be seen that the two adjusting bolts 82 which extend through the enlarged portions 77, engage the ends of the guide member 81 and that by rotating screws 82, the position of the guide member can be changed with respect to the bracket 74. By adjusting screw 80, the distance between the adjacent surface of member 74 and guide member 81 can be adjusted and by means of the screws 82, their angular relation can be adjusted. Lock nuts 83 serve to hold the screws 82 in adjusted position. Guide member 81 has a flange 84 that projects to the right thereof when viewed as in Figures 7 and 8 and this flange is provided with an elongated opening 85 in which is positioned a roller 86 that is pivoted to the lower end of a pin 87 that extends downwardly from a bar 88. The sides of the elongated opening 85 serve to prevent rotary motion of bar 88 and the ends of this elongated opening serve to limit the extent of the longitudinal movement. By moving guide member 81 towards and away from bracket 76, bar 88 will be rotated about its axis for a purpose that will hereinafter appear. The bar 88 is slidably supported in two spaced bearings 89 and 90. These bearings are attached to and project from one side of a steel bar 91 that is pivotally attached to member 74 by means of a pin 92, which is preferably positioned at the middle of bar 91. Cap screws 93 extend through vertically elongated openings in member 74 and are threadedly connected with bar 91 so that the latter can be turned to a limited extent about the pivot pin 92. Adjusting screws 94 extend through the flange 75 and engage the ends of bar 91. When the cap screws 93 are loosened, bar 91 can be adjusted about the axis of the pivot pin by means of screws 94 and when the proper adjustment has been effected, cap screws 93 are tightened and the lock nuts 94 are also tightened, thereby clamping bar 91 in position. Since the bearings 89 and 90 are integral with or rigidly attached to the bar 91, it is evident that by this adjustment the axis of the bar 88 can also be adjusted. A pin 96 projects from one side of bar 88 and serves as a pivot for one end of link 97, whose other end is connected to a crank arm 98 by means of a pivot 99. The other end of crank arm 98 is nonrotatably connected with a shaft 100. The inner end of this shaft is journalled in the inner wall of part 28 and its outer end is journalled in a bearing provided therefor in a flat bar 101 that is secured to the outer surface of the part designated by reference numeral 26. A handle 102 is attached to the outer end of shaft 100 and serves as a means for rotating the same. It is evident that when shaft 100 is rotated in a counterclockwise direction from the position shown in Figure 6, it will move bar 88 towards the left and therefore by oscillating shaft 100, the bar 88 can be reciprocated. The extent of the reciprocation is determined by the length of the opening 85. Roller 86, as above explained, prevents the bar from rotating about its axis during reciprocation. The bar can, however, be adjusted rotarily by the mechanism shown in Figures 7 and 8.

Referring now more particularly to Figures 6 and 8, it will be seen that the front end of bar 88 has a diametrically positioned slot 103 in which is positioned a flat steel member 104. A pivot 105 extends through the plate 104 and through the opposite sides of bar 88 and secures the plate to the bar in such a manner that it can be adjusted about the axis of the pivot 105. Plate 104 has a rearwardly extending finger 106 positioned above the bar and a similar extension 107 positioned below the bar. An adjusting screw 108 is threadedly mounted in finger 106 and a helical compression spring 109 is positioned in a cylindrical depression in the upper surface of part 107 and engages the under surface of the bar in the manner shown in Figure 6. It is evident that spring 109 tends to turn the plate clockwise about pivot 105 and that this action is resisted by the screw 108. To turn plate 104 in a counterclockwise direction, screw 108 must be turned so as to raise finger 106. A shaft 110 is mounted for rotation in a bearing adjacent the lefthand end of plate 104, when viewed as in Figure 6, and attached to the outer end of this shaft is a toothed rotary cutter 111. A bevel gear 112 is attached to the opposite end of shaft 110 and this gear meshes with a similar gear carried by a shaft 113 that is nonrotatably connected with a square tube 114. The two bevel gears are positioned in a housing 115 which has a removable cover 116. Whenever the square tube is rotated, the cutter will also be rotated.

For the purpose of rotating the cutter 111, a motor 73 has been provided, one end of the motor shaft is provided with a spur gear 117 that is in mesh with a spur pinion 118 that is carried on a square shaft 119. This shaft is journalled in a bearing 120. Shaft 119 is telescopically connected with the square tube and therefore the latter can be rotated while it is moving longitudinally. It is evident that whenever the motor is operating it will cause the cutter 111 to rotate.

The cutter must be adjusted vertically to such a position that when it is reciprocated over the film for the purpose of removing the emulsion therefrom, it does not cut too deeply into the film and cuts sufficiently deep to remove the emulsion and this adjustment is effected by means of the screw 108.

Since the cutter must operate on the upper surface of the film that rests on plate 42 (Figure 4), it is evident that the part of clamping jaws 55 and 56 must be removed from the position shown to a vertical position to permit the cutter to operate. Since motor 73 is connected in series with the two mercury switches, both of these must be closed before the motor can operate.

Figure 3:
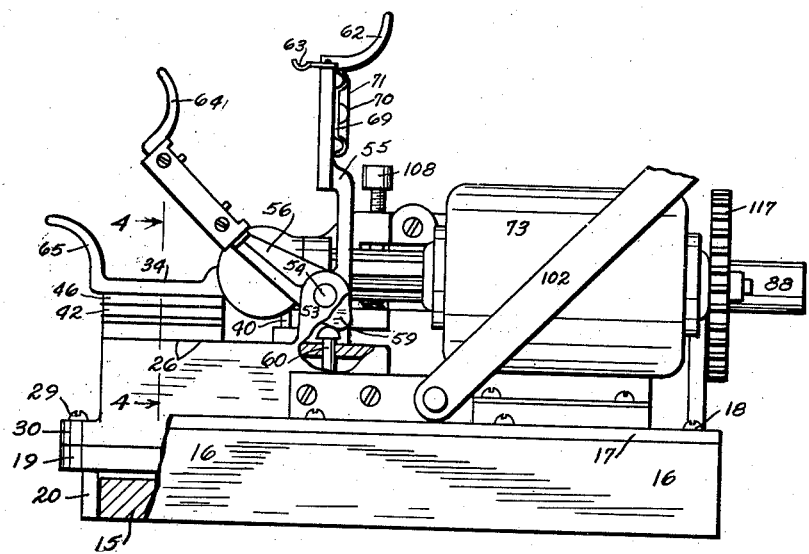
Figure 3 is a side elevation looking in the direction of arrows 3 in Figures 1 and 2.
Figure 4:
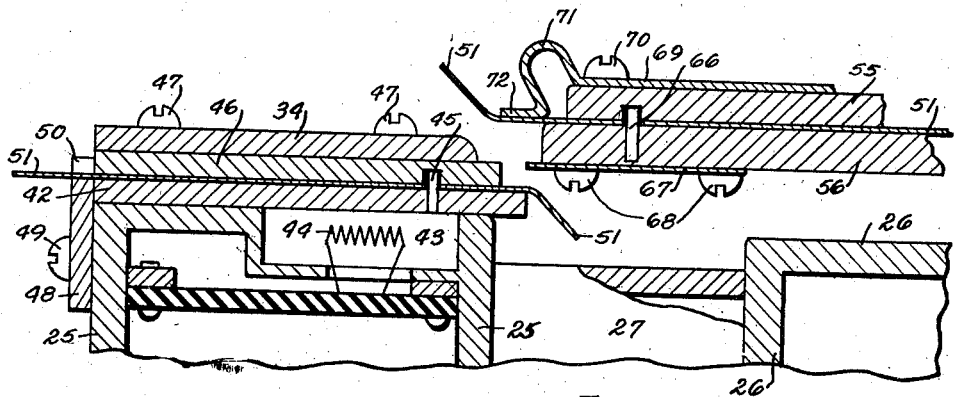
Figure 4 is a fragmentary section taken on lines 4—4, Figures 1 and 3, and shows the film shearing and clamping members in partly open position.
Figure 11:
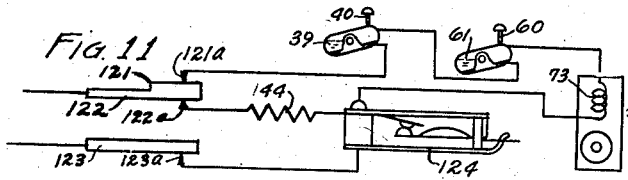
Figure 11 is a diagram showing the wiring connections.

In Figure 9, the mechanism by means of which switch 39 is closed, has been illustrated and in Figures 3 and 11 the corresponding means for operating switch 61 have been shown. In order to have the motor operate, jaw member 34 must be in film clamping position while the pair of jaw members 55, 56 must be in vertical position.

Figure 2:
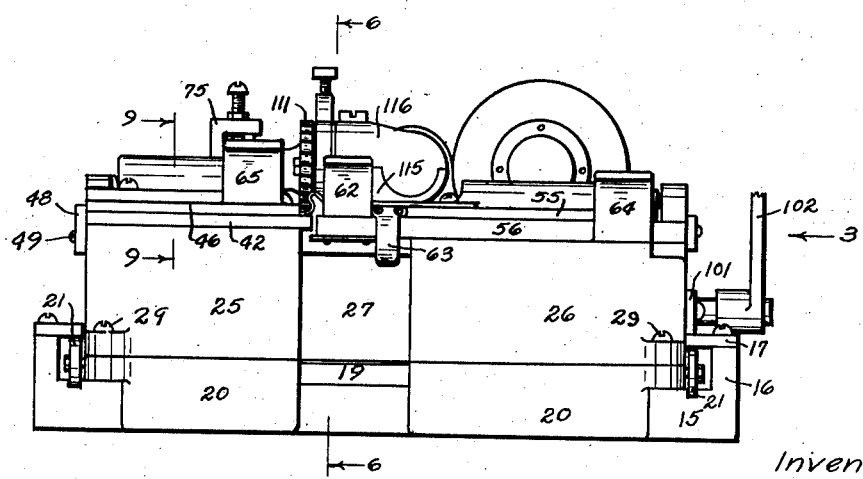
Figure 2 is a front elevation thereof looking in the direction of arrow 2, in Figure 1.

Let us now assume one end of the film is clamped between plates 42 and 46 as shown in Figure 4, and that the cleaner is in the position shown in Figure 1. To operate the cleaner the pair of jaw members 55, 56 must be moved to vertical position, whereupon the motor will automatically start and after the motor has started, the operator grasps the handle 102 and turns it in a counterclockwise position when viewed as in Figure 3, whereupon rod 88 will be moved forwardly, thereby bringing the cutter into engagement with the upper surface of the film. The length of the reciprocation is determined by the length of the opening 85. It is evident that the cleaning of the film can be effected very quickly as it merely requires the operator to reciprocate the handle. After the surface of the film has been cleaned, cement is applied and the pair of jaw members moved downwardly to the positions shown respectively in Figures 4 and 5, which movement shears the film and moves the surfaces of the film ends into engagement. The strip 72 of spring 69 holds the two film ends in engagement for the time necessary for the cement to set. After the cement has set, clamping jaws 34 and 55 are raised, whereupon the film can be removed.

By slidably supporting the splicer on the support 15, it can be moved back when not in use so as to prevent it from occupying space that can be otherwise employed.

The transverse sliding movement between the splicer and the base makes it possible to provide a self-opening switch for the motor. This switch comprises three parallel elongated contacts which have been indicated by numbers 121, 122 and 123. These contacts are carried by the support and cooperating contacts 121a, 122a and 123a are carried by the splicer. Contacts 121 and 121a control the current supply to the motor 73, and therefore the latter will not be connected in the circuit when the parts are in the position shown in Figure 6, but only when the splicer is moved forwardly to operative position. The heating element 44 is constantly connected in the circuit so that the parts will always remain hot. A thermostat, 124, which has been indicated in a general and diagrammatic manner in Figure 11, controls the current supply to both the motor and the heating element so as to cut off the current in case the parts become superheated.

Attention is called at this point to the means for effecting rotary adjustment of bar 88, which has been illustrated in Figures 7 and 8. The primary purpose of this is to adjust the cleaner 111 to taper the end of the film and to vary the inclination of the cleaned surface with respect to the film surfaces.

Figure 5:
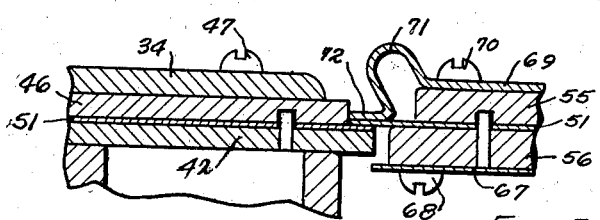
Figure 5 is a fragmentary section similar to that shown in Figure 4, and shows the position of the parts after the film has been sheared and while the ends are held in superposed position.

Referring now to Figures 4 and 5, attention is directed to spring plate 69 and to the fact that the flat strip 72, which is connected thereto by the curved portion 71 projects outwardly in the plane of jaw 55. The edge of part 72 is the shear edge and since this is resiliently connected with the rest of the strip, it can be so adjusted that it will move slightly when it engages the shear edge of the high speed steel plate 46 and it therefore keeps sharp. Screws 70 pass through oversize holes in plate 69 so that the latter may be adjusted relative to jaw 66. Plate 67 is also adjustably attached to jaw 66.

The heating element 44 maintains the parts at the desired temperature and is always functioning. The motor can be operated only when the splicer is in operative position and then only when jaw 34 is in film clamping position and when the pair of jaws are in vertical position.

The rotary adjustment of bar 88 makes it possible to taper or chamfer the cleaned surface to make a splice having its leading edge thin.

Applicant is aware that some of the elements and some of the means illustrated may be replaced by specifically different mechanical elements that perform the same function in substantially the same way and such substitutions are contemplated within the scope of the appended claims.

Having described the invention what is claimed as new is:

1. In a film splicer having a base, provided with an upwardly projecting portion whose upper surface forms a film support, means for holding the film in place on the support, said means terminating a short distance from the end of the support whereby a portion of the film directly above the support will be exposed, means for removing emulsion from the exposed portion, said means comprising a bracket, a bearing support pivoted thereto, a bearing carried by the support, a bar mounted in the bearing for longitudinal reciprocation, means for resisting forces tending to rotate the bar, means for limiting the extent of the bar's longitudinal movement, a rotary toothed cutter carried by the end of the bar, means comprising a shaft for supporting and rotating the cutter, a bevel gear on one end of the shaft, a gear housing supported on said shaft, a second shaft rotatably supported at one end by the housing, said shaft having the supported end operatively connected to a bevel gear positioned in the housing, in engagement with the first mentioned bevel gear, an electric motor carried by the base, a third shaft slidably connected with the second shaft, means for rotating the third shaft by power derived from the motor, and manually operable means comprising a handle pivoted to the base, and a link connecting the handle to the bar for reciprocating the bar and the cutter.

2. A device in accordance with claim 1 in which the bearing support is mounted on a horizontal pivot and in which means is provided for adjusting it about the pivot to vary the distance from the upper surface of the support to the toothed cutter.

3. A film splicing device, comprising in combination, a base, a film supporting projection extending upwardly therefrom, means comprising a jaw pivotally connected to the base and operatively associated with the projection for clamping a film against the upper surface thereof, a portion of the supporting surface extending beyond the clamping means, and means for removing emulsion from a transverse strip of the upper surface of the film, said means comprising, a bracket extending upwardly from the base, a bearing support attached to the bracket for movement about a horizontal pivot, means for adjusting the bearing support relative to the base about its pivot, a bearing on the support, a bar slidably mounted in the bearing, manually operable means for reciprocating the bar, means for resisting forces tending to rotate the bar in the bearing, a horizontal pivot carried by one end of the bar, a plate secured to the bar by said pivot, a cutter rotating shaft mounted for rotation in the forward end of the plate, a circular toothed cutter secured to said shaft, means comprising a spring for urging the rear end of the plate downwardly, means comprising a screw carried by the rear end of the plate and engaging the bar for moving the plate upwardly about its pivotal connection with the bar in opposition to the force exerted by the spring, a motor carried by the base, and means comprising a shaft having two telescopically connected sections and a bevel gear for transmitting rotary motion from the motor to the cutter while the bar is reciprocated.

4. A mechanism in accordance with claim 3 in which means is provided for adjusting the bar rotatably about its axis.

5. A film splicer comprising in combination, a base, having an upward projection whose upper surface forms a support for a moving picture film, a clamping jaw pivotally connected with the base for movement towards and away from film clamping position, means for removing emulsion from the upper surface of the film comprising, a bracket secured to the base and extending upwardly therefrom, a pivot extending horizontally from one side of the bracket, a bearing support secured to the pivot, means comprising screws operatively associated with the bracket and the support for effecting an adjustment of the latter about its pivot, a bearing carried by the support, a bar slidably mounted in the bearing, a guide member attached to the bracket and positioned below the bar, said guide members having an elongated opening, a pin projecting from the bar into the opening in the guide member, means comprising a handle pivoted to the base, and a link mechanism operatively connecting the handle to the bar for reciprocating the latter, a circular rotary cutter, having an abrading peripherial surface, attached to the forward end of the bar, and means for rotating the cutter, comprising a motor carried by the base, a telescopic shaft, and two bevel gears arranged in cooperating power transmitting relation, one of the gears being connected with the cutter and the other with one part of the shaft.

6. A device in accordance with claim 5 in which means is provided for adjusting the position of the guide member relative to the bracket.

7. A film splicing device, comprising in combination, a base, means comprising a jaw member movably attached to the base for clamping a film and holding it stationary relative thereto, means for removing emulsion from the upper surface of the film, comprising a rotary cutter slidably connected with the base for reciprocal movement across the film, manually operable means for reciprocating the cutter, and means for rotating it while it is reciprocated, said last named means comprising, a motor carried by the base, a telescopic shaft, and a bevel gear assembly arranged in power transmitting relation, and means for adjusting the direction of reciprocation of the abrading member in a vertical plane.

8. A device in accordance with claim 7 in which means is provided for adjusting abrading members rotatably about its axis of reciprocation.

9. In a film splicing machine, a base, an upwardly extending bracket carried thereby, a bearing support attached to the bracket for movement about a horizontal pivot, a bearing carried by the support, two adjusting screws threadedly attached to the bracket and positioned to engage the bearing support on opposite sides of the pivot, said screws serving to adjust the position of the support about the pivot and to clamp it in adjusted position, a bar slidably mounted in the bearing, manually operable means for reciprocating the bar, comprising a handle pivotally connected to the base, a crank arm, and a link connecting the crank arm to the bar, and a rotary cutter carried by one end of the bar.

10. In a film splicing apparatus, in combination, a base, a film support projecting upwardly therefrom, a clamping jaw pivotally connected with the base for movement towards and from the support, a normally open circuit closer carried by the base, means operated by the movement of the clamping jaw towards the support for moving the circuit closer to closed position, a pair of clamping jaws pivotally attached to the base for movement relative to the base and relative to each other, stops for limiting the movement of the pair of jaws in both directions relative to the base, a second normally open circuit closer carried by the base, means operated by the upward movement of the pair of jaws, for moving the said second circuit closer to closed position, the two circuit closers being connected in series, a rotary cutter carried by the bar, means comprising a handle pivoted to the base and a link mechanism operatively connecting the handle with the bar for reciprocating it, a motor carried by the base, the motor being connected in series with the two circuit closers, and a motion transmitting mechanism connecting the motor to the cutter for rotating it.

11. In a film splicing device, a base, a film support projecting upwardly therefrom, means for holding a film in engagement with the top of the film support, and a mechanism for removing emulsion from the upper surface of the film, said means comprising, a bracket projecting upward from the base, a pivot projecting laterally from the bracket, a bearing support carried by the pivot and movable relative to the bracket, bearings on the support, means for tilting the bearing support about the axis of the pivot, comprising two screws which extend through the bracket and engage the top of the bearing support on opposite sides of the pivot, a bar slidable in the bearing, a slotted guide member positioned below the bar, the bar having a radial projection extending into the slot, the ends of the slot forming limit stops, means for adjusting the position of the guide member laterally with respect to the bracket, said means comprising three screws, at least one of which is threadedly connected with the guide member, and means for reciprocating the bar, said means comprising a handle pivoted to the base, and means comprising a crank arm operatively connected with the handle and a link connecting the crank arm to the bar for moving the latter longitudinally whenever the handle is rocked about its pivot.

12. A film splicer, comprising in combination, a base, a film support projecting upwardly therefrom, means for clamping a film in position on said support, and means for removing emulsion from the upper surface of the film, said means comprising a bracket carried by the base, a bearing support attached to the bracket for movement about a horizontal pivot, means for adjusting the bearing support about the pivot and for holding it in adjusted position, a round bar slidably and rockably mounted in the bearing, a toothed rotary cutter carried by one end of the bar, a motor carried by the base, means for rotating the cutter from the motor, comprising a telescopic shaft and a bevel gear mechanism, and means comprising an elongated guide member movably connected with the bracket and a radial projection on the bar for adjusting the bar rotatably about its axis, whereby the angular relation of the cleaned surface with respect to the surface of the support can be varied.

JACOB M. GOLDBERG.